United States Patent [19]

Mears

[11] Patent Number: 4,719,949

[45] Date of Patent: Jan. 19, 1988

[54] AUTOMOTIVE NOZZLE-ACTUATED REFUELING EMISSION SYSTEM SHUTOFF VALVE

[75] Inventor: William G. Mears, Kennett Square, Pa.

[73] Assignee: Mobil Oil Corporation, New York, N.Y.

[21] Appl. No.: 880,426

[22] Filed: Jun. 30, 1986

[51] Int. Cl.⁴ .............................................. B65B 3/04
[52] U.S. Cl. .................................... 141/301; 141/325; 137/587; 220/86 R; 220/85 VR; 220/85 VS; 220/85 S
[58] Field of Search ....................... 141/1–12, 141/37–66, 285–310, 325–327; 220/86 R, 85 VR, 85 VS; 137/587, 588

[56] References Cited

U.S. PATENT DOCUMENTS 4,142,647  3/1979  Walters .............................. 137/587
4,625,777  12/1986  Schmidt ............................. 141/286

Primary Examiner—Houston S. Bell, Jr.
Attorney, Agent, or Firm—Alexander J. McKillop; Michael G. Gilman; Van D. Harrison, Jr.

[57] ABSTRACT

A valve activated by inserting a fuel nozzle in a fuel tank fill line allows hydrocarbon vapors from the tank to be displaced into an adsorbent canister. The valve closes when nozzle is withdrawn. The valve prevents loss of liquid when fuel tank is accidentally inverted.

6 Claims, 9 Drawing Figures

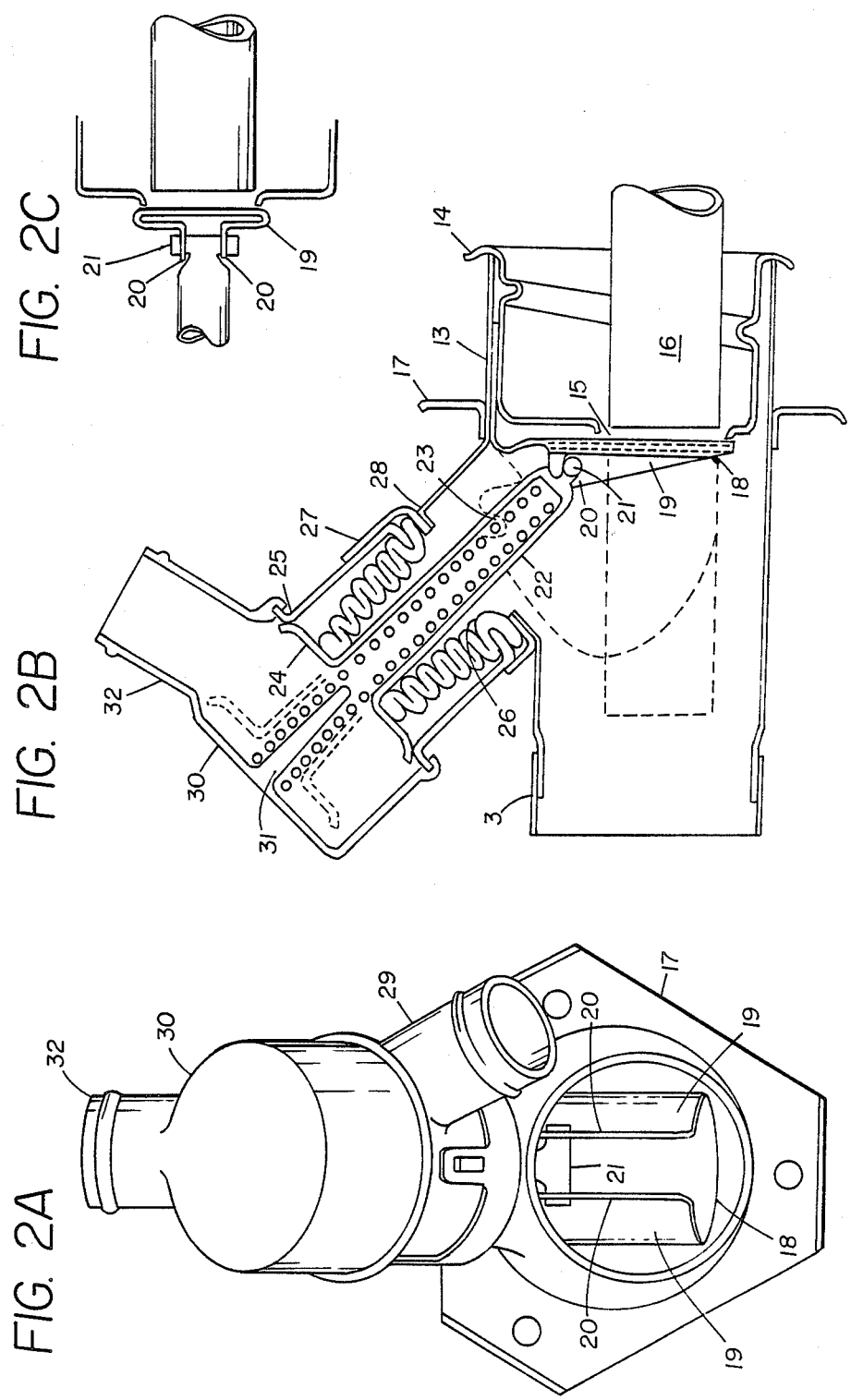

VAPOR →→↗
LIQUID ≈≈≈

VAPOR →→↗
LIQUID ≈≈≈

AUTOMOTIVE NOZZLE-ACTUATED REFUELING EMISSION SYSTEM SHUTOFF VALVE

NATURE OF THE INVENTION

This invention relates in general to a fuel flow shutoff valve. More particularly, it relates to a device that will automatically shut off or block the flow of fuel in a fuel line connected to the fuel tank of a motor vehicle when the motor vehicle containing the fuel tank rolls over or otherwise attains an attitude in which fuel normally would escape from the system.

BACKGROUND OF THE INVENTION

The control of hydrocarbon vapors displaced from a vehicle fuel tank during refueling is becoming increasingly important throughout the United States. One method of control is to adsorb the vapors in a charcoal-filled canister mounted on the vehicle. This has proved to be an effective control method, but relatively large tubing is required to carry the displaced vapors to the charcoal filled canister and the canister must be vented to the atmosphere. There is thus created a channel for excessive gasoline leakage if the vehicle overturns. Safety regulations limit the rollover gasoline spillage to very small quantities. Consequently any on-board refueling emissions control system must incorporate a device to limit spillage to a minimum amount if the vehicle is unexpectedly overturned.

Devices are known to prevent the spill of fuel from an engine when a motor vehicle is involved in an accident causing it to overturn or tip sufficiently to lose fuel. For example, U.S. Pat. No. 2,619,185 discloses such a device. Also, U.S. Pat. No. 3,942,504 to Ellsworth discloses an improved valve construction for effecting the same object.

A primary object of this invention therefore is to provide a means for venting and adsorbing gasoline vapors from a gasoline tank displaced during the filling of the tank with additional fuel. Still another object of the invention is to provide an improved safety device which if the vehicle is overturned will automatically function to prevent the loss of any substantial amount of gasoline fuel from the fuel tank.

SUMMARY OF THE INVENTION

Briefly stated this invention comprises a valve to be positioned in the fill line leading to a fuel tank for a gasoline engine. The valve is so positioned that a nozzle from an outside source inserted to inject fuel into the line activates a flapper valve which in turn operates a second valve enabling communication between the top of the tank and a conduit leading to a charcoal adsorption chamber. Upon removal of the nozzle from the system the interior valve returns to a closed position so as to seal off the top of the tank from the charcoal adsorption system.

DESCRIPTION OF THE DRAWINGS

FIGS. 2A, 2B and 2C are diagrams of a preferred and best mode valve configuration of this invention.

DETAILED DESCRIPTION OF THE INVENTION

Figure 1:
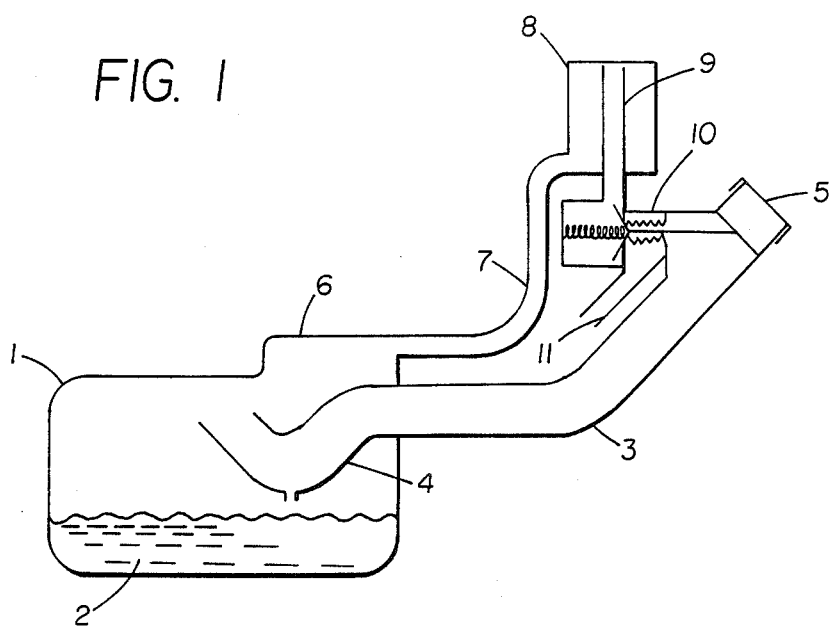
FIG. 1 is a diagram of the fuel tank and associated filling and vapor venting apparatus.

FIG. 1 shows a schematic drawing depicting the use of the valve of this invention in a typical vehicle fuel tank system. The fuel tank is equipped with components to direct vapors displaced during refueling into tubing connected to a canister for absorbing the vapors. The fuel tank (1) contains gasoline (2) which was introduced through fill tube (3) and fill trap (4). The fill tube is sealed by cap (5). A vapor collection dome (6) is formed in the top of the tank to which is connected a vent line (7) leading to the bottom of a surge tank (8) for vapor liquid separation. A vapor line (9) from the top of the surge tank leads into the nozzle-actuated refueling emission system shutoff valve (10) which seals the tank-connected components from the vent line (11) leading to the adsorption canister.

FIGS. 2A, 2B and 2C describes details of the valve (10) from FIG. 1.

The filler neck (13) forms the mounting for the valve. Fastened into the filler neck is the liner (14) which contains threads to engage the filler cap (not shown). The liner has a hole (15) slightly larger in diameter than the fuel dispensing nozzle (16) to guide the nozzle, restrict fuel splashback, and to prevent larger nozzles from being inserted. The nozzle is of the type which automatically shuts off when fluid begin to back up in it. Around filler neck (13) is a collar (17) for mounting the filler neck to the vehicle structure. Attached to the end of the filler neck (13) is the fill tube (3). Covering hole (15) is a flapper (18) made of thin resilient metal which swings away from hole (15) when nozzle (16) is inserted, and which seals against hole (15) when nozzle (16) is withdrawn. The liner (14), hole (15), and flapper (18) are widely used with filler neck (13) and fill tube (3) in production vehicles to prevent larger-diameter leaded fuel nozzles or funnels from being used to fuel the vehicle. Flapper (18) is fabricated with folded-over extensions (19) forming sockets (20) for attachment of pivots (21) at the end of the valve stem (22). The folded-over extensions provide rigidity to the flapper (18) to prevent distortion and bending as it is displaced by the nozzle. The valve stem (22) is hollow to accommodate a compression spring (23) which forces the valve face (24) in tight contact with the sealing surface of valve body (25) and forces the flapper (18) close to the rim of hole (15). A bellows seal (26) held tightly between valve body (25) and attachment ring (27) seals the filler neck volume from the interior of the valve body when the valve (22) is moved by the flapper (18). Retaining ring (27) is attached in a leak-tight manner to a mating surface (28) formed on filler neck (13). A vent tube (29) is formed in the side of valve body (25). Valve cap (30) is attached in a leak-tight manner to the valve body (25), and contains a guide rod (31) to locate spring (23) and valve stem (22) when the valve is in the open position. Vent tube (32) is formed in the side of valve cap (30). When the valve is closed the interior of the valve cap (30) is sealed off from the interior of the valve body (25) by the valve face (24). When the valve is opened by insertion of the fuel nozzle (16), a conduit for vapor flow is formed from vent tube (32), through the interior of the valve cap (30), through the open end of valve body (25), past the outer surface of the bellows seal (26) and out vent tube (29). The flow may also be in the opposite direction; in through vent tube (29), and out through vent tube (32). The bellows seal (26) prevents vapor from within the valve from leaking out into the interior of the filler neck. The closing force of spring (23) is sufficient to keep the valve face (24) sealed against the valve body (25) under any combination of fuel hydrostatic and vapor pressure encountered during rollover which may be acting on the bellows seal (26) tending to open the valve.

Figure 3:
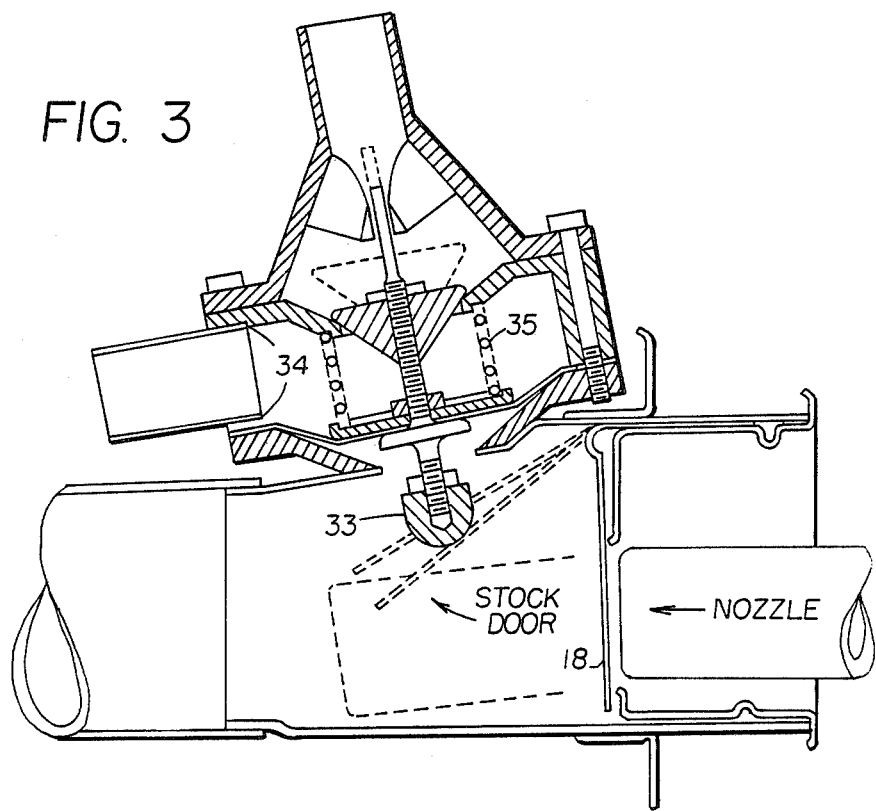
FIG. 3 is another embodiment of the valve.
Figure 4:
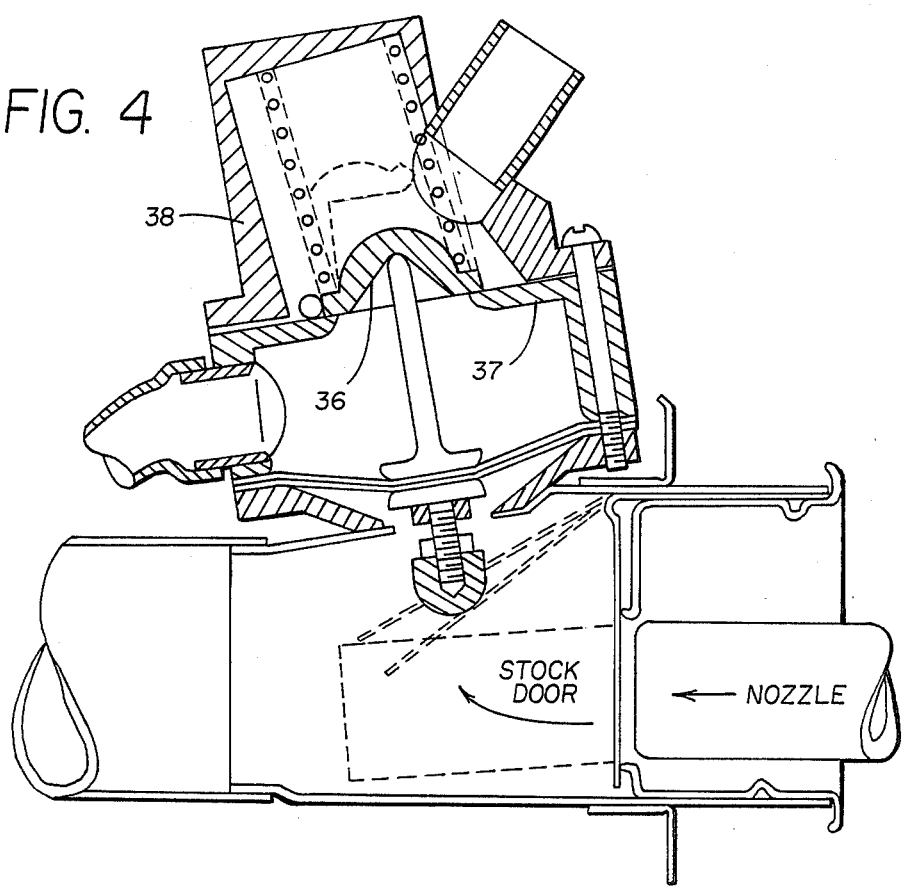
FIG. 4 is still another embodiment of the valve.

FIGS. 3 and 4 show other embodiments of the valve adapted to existing filler necks. In FIG. 3, the flapper (18) pushes against the valve tip (33) to open the valve as shown by the dotted lines. The seal between the valve body and filler neck interior is accomplished by flexible diaphragm (34), and the valve is held closed by spring (35).

In FIG. 4 a flat-surfaced flapper (36) provides the seal between the valve body (37) and valve cap (38).

Figure 5:
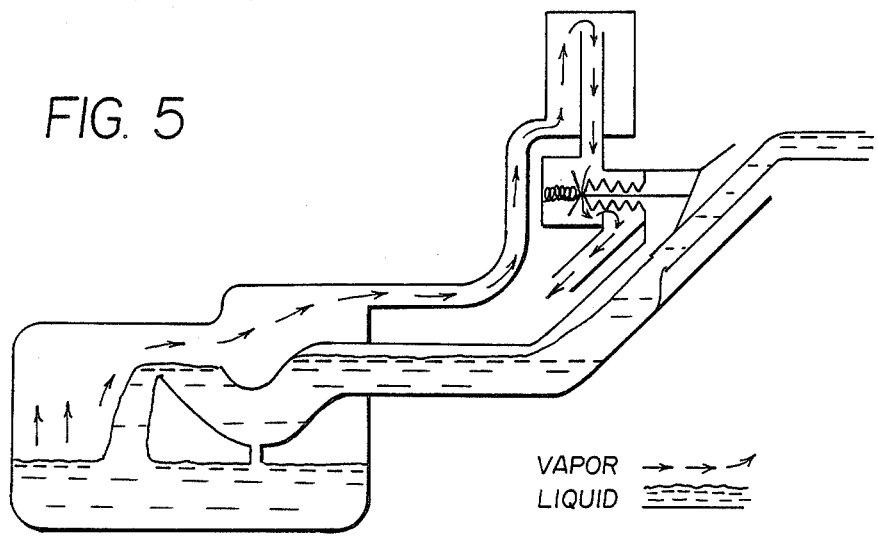
FIG. 5 is a diagram showing the valve in place in a fuel system wherein the final tank is being filled.
Figure 6:
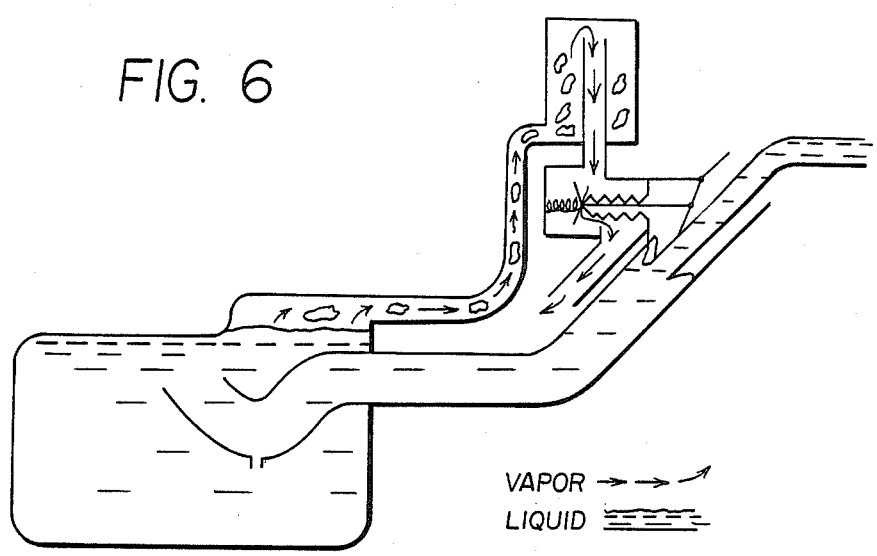
FIG. 6 is a diagram showing the valve in place in the system wherein the tank is filled and liquid fuel is being carried into the vapor vent line.

Operation of the valve during refueling is shown in FIGS. 5 and 6. In FIG. 5, the refueling nozzle (16) has been inserted in the filler neck, opening the valve. Fuel flows through the fill tube 3, through the trap 4, and into the tank 1. The trap prevents vapors from flowing back up the fill tube. A small hole in the bottom of the fill tube allows the trap to empty as fuel is consumed during vehicle operation. Vapors displaced by the incoming fuel collect in the vapor collection dome 6, flow through the vent line 7 into a surge tank 8, out through the vapor line 9, through the open nozzle-actuated shut-off valve 10, and out the vent line 11 leading to the adsorption canister (not shown) filled with charcoal or other adsorbent material. FIG. 6 shows the system at the point when the automatic nozzle has shut off. Liquid and vapor have been splashed into the surge tank, where the vapor has separated and been allowed to flow out through the valve to the vent line leading to the adsorption canister. At the same time fuel has backed up into the filler tube, eventually reaching the refueling nozzle and caused it to close automatically.

Figure 7:
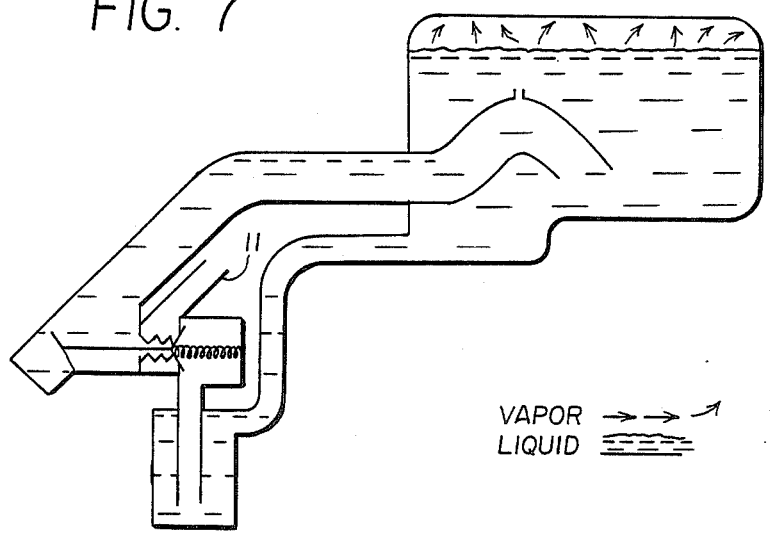
FIG. 7 is a diagram of the system when it has been completely inverted 180°.

FIG. 7 shows the system when it has rolled over 180°. The nozzle actuated shutoff valve is held closed by spring tension preventing fuel from passing through the valve into the vent line leading to the adsorption canister.

What is claimed is:

1. A fluid flow device for use in connection with a motor vehicle having a fuel-containing line connecting a fuel tank to a portion of the engine fuel combustion system comprising:
   (a) a first hollow tubular segment adapted to be inserted in a conduit connected to said fuel tank through which conduit liquid fuel ordinarily is introduced into said fuel tank;
   (b) a first valve seat positioned and dimensioned within said tubular segment sufficiently near one end of segment so as to permit passage therethrough of a fueling nozzle;
   (c) a flapper pivotably mounted within said tubular segment to seat against said valve seat and seal said seat in the absence of a fueling nozzle being inserted in said valve seat
   (d) a second tubular segment attached to, and communicating with said first hollow tubular segment.
   (e) a second valve seat positioned in said second tubular segment;
   (f) a second valve and valve stem having an upstream side and a downstream side positioned coaxially within said second tubular segment and sealing against said second valve seat and engaging said flapper of (c) so that when the flapper is opened said valve stem is displaced longitudinally;
   (g) means for urging said second valve and valve stem of (f) into a closed position;
   (h) means providing a flexible seal between the flapper valve in an open position and said second valve when both are in an open position;
   (i) a third tubular segment attached near one end to said second tubular segment and communicating with the upstream side of said second valve when said valve is closed and with the downstream and upstream sides when said valve is open, the other end of said third tubular segment communicating with the upper portion of said tank; and
   (j) a fourth tubular segment attached near one end to said second tubular segment and communicating with the downstream side of said second valve when said second valve is closed and with the downstream and upstream sides when said valve is open.

2. The valve device of claim 1 wherein said means of (h) providing a flexible seal is a cylindrical bellows.

3. The valve device of claim 1 wherein said means of (h) providing a flexible seal is a flexible diaphragm.

4. The valve device of claim 1 wherein said second valve is pivotally mounted at one point on its surface and is opened by the longitudinal movement of a separately fabricated valve stem.

5. A fuel vapor recovery system comprising a liquid fuel tank connected to a vapor adsorption canister by a conduit having the valve device of claim 1 positioned in the conduit at a location intermediate the liquid fuel tank and the vapor adsorption canister.

6. The vapor recovery system of claim 5 wherein a surge chamber is inserted in the conduit intermediate the liquid fuel tank and said valve device.

* * * * *